Figure 1:
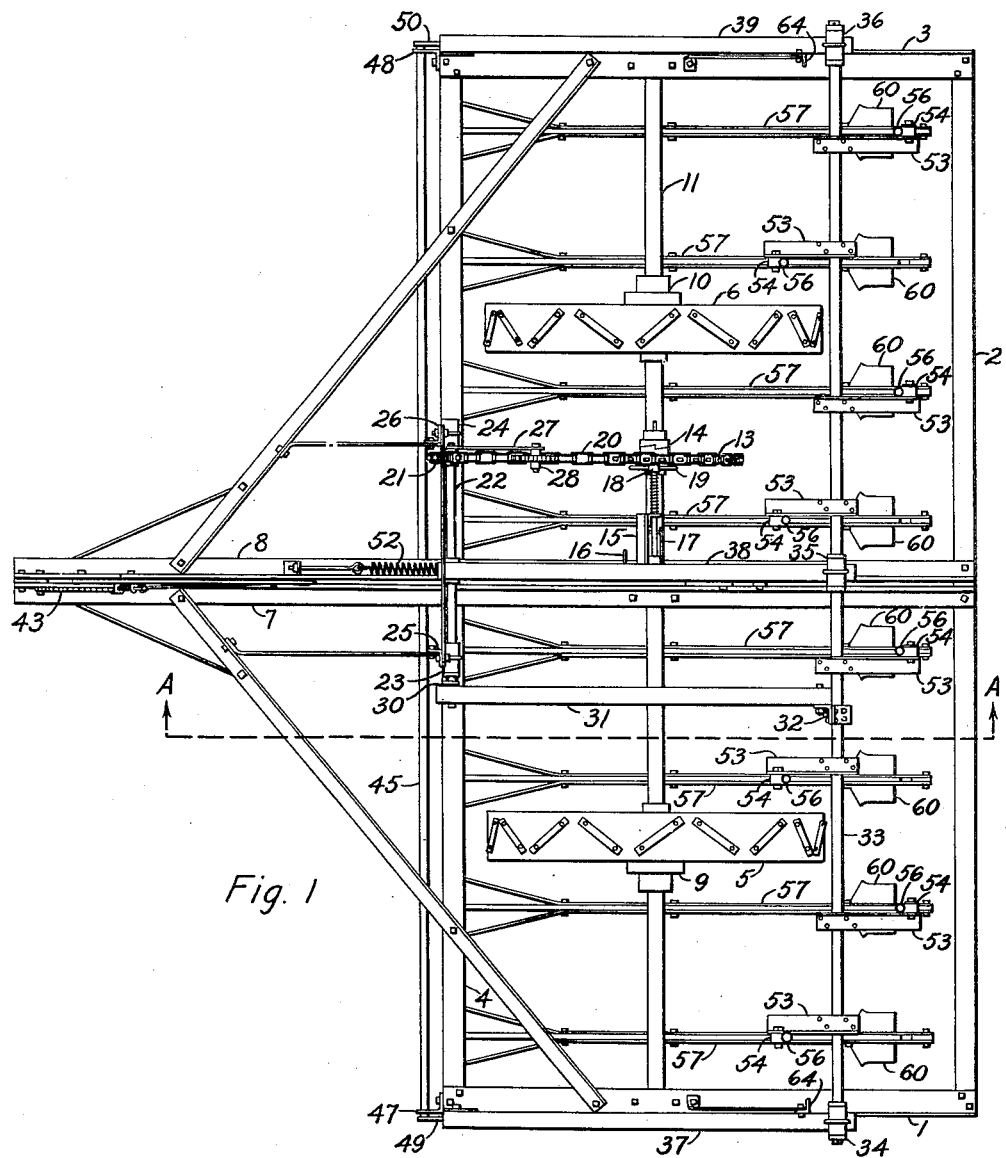

May 2, 1933.    R. H. DAVIS    1,907,251
MOISTURE AND SOIL CONSERVING CULTIVATOR
Filed Aug. 10, 1932    2 Sheets-Sheet 1

Witnesses
Edward L. Lemke
Gerald E. Ryerson

Inventor
Raymond H. Davis

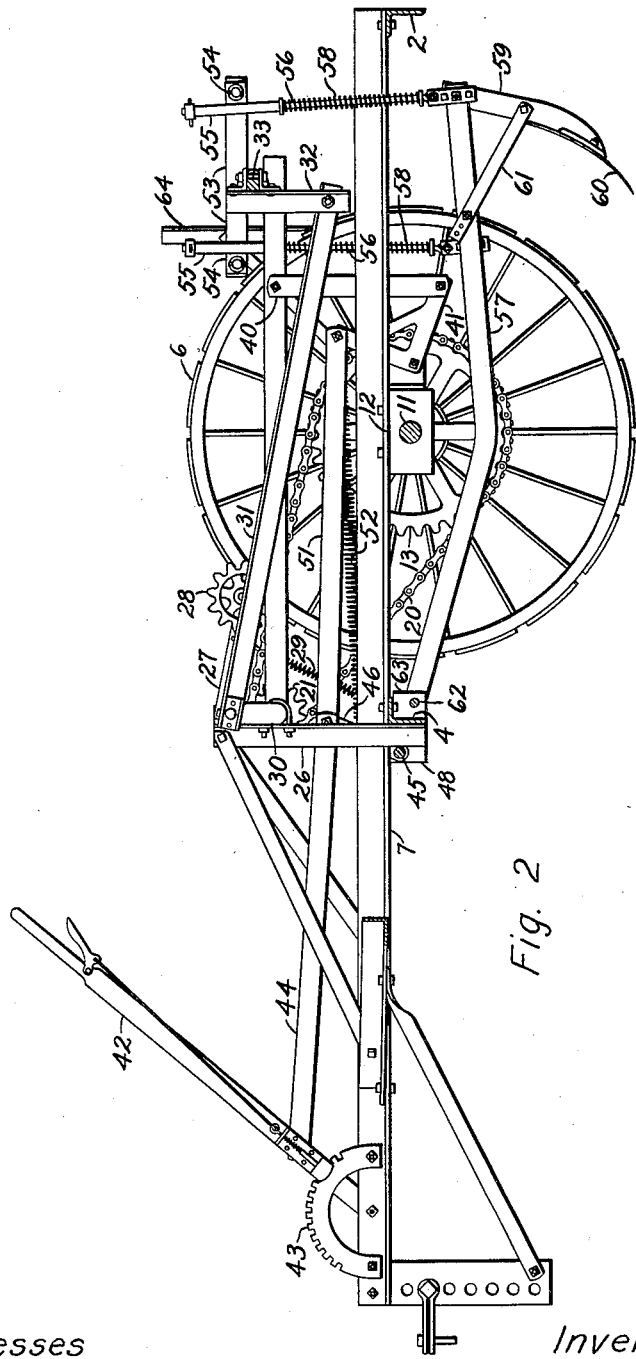

Patented May 2, 1933

1,907,251

UNITED STATES PATENT OFFICE

RAYMOND H. DAVIS, OF LA CROSSE, WISCONSIN, DEDICATED TO THE FREE USE OF THE PUBLIC

MOISTURE AND SOIL CONSERVING CULTIVATOR

Application filed August 10, 1932. Serial No. 628,208.

(GRANTED UNDER THE ACT OF MARCH 3, 1883, AS AMENDED APRIL 30, 1928; 370 O. G. 757)

This application is made under the act of March 3, 1883, as amended by the act of April 30, 1928, and the invention herein described, if patented, may be manufactured and used by or for the Government, for governmental purposes, without payment to me of any royalty thereon.

I hereby dedicate the invention herein described, to the free use of the public, to take effect upon the granting of a patent to me.

This invention relates to machines designed to so prepare soil as to conserve the moisture falling thereon and to conserve the soil itself. It is, of course, apparent that if soil is prepared in such a way as to provide a plurality of depressions or pockets in the surface thereof, these pockets will retain in place the moisture falling upon the soil and thereby result in greater moisture absorption and less soil erosion by water. It is desirable that the dirt taken from the pockets be accumulated in piles or ridges near the pockets so that when the depressions are full to overflowing the excess moisture will escape by a zig-zag course around the piles of dirt thereby still further retarding the escape of the water and resulting in added absorption and due to the roughness of the soil so prepared the wind erosion during the dry season is also retarded. It is desirable that a machine for this purpose be adapted to operate up and down a slope or on a contour.

I attain these objects by means of the machine illustrated in the accompanying drawings in which, Figure 1 is a top plan view of the entire machine and Figure 2 is a sectional view on dotted line AA of the top plan view.

Similar numerals refer to similar parts throughout the views. Referring to the drawings the machine consists of a rectangular shaped steel framework 1 2 3 4 mounted on two driving wheels 5 6 with a tongue or draw-bar 7 8 by which it can be drawn about by a tractor. The two driving wheels 5 6 are located inside the frame and are mounted on ratchet hubs 9 10 which in turn are keyed to the axle 11. A hickory bearing 12 is mounted under the tongue or draw-bar 7 8 and two additional hickory bearings not shown but similar to bearing 12 are mounted on the underside of the frame 1 and 3 at each end of the axle, in which the axle 11 is free to turn.

On the axle 11 between the driving wheel 6 and the tongue or draw-bar 7 8 is mounted a main drive sprocket wheel 13. The hub of this sprocket wheel is part of a ratchet tooth clutch 14 one-half of which is keyed to the axle 11. The throw-out mechanism for the clutch is mounted on a throw-out carrier 15 which is a short piece of angle iron riveted to the tongue or draw-bar 8 at right angles to it. On the carrier 15 is a throw-out crank 16 which pulls the throw-out rod 17 and the main drive throw-out 18. This throw-out 18 engages with a flange 19 on the hub of the main drive sprocket 13 and pulls the sprocket 13 which is free to slide on the axle 11 to one side, thus disengaging the teeth of the ratchet tooth clutch 14 and leaving the axle 11 free to turn in the hub of the sprocket 13.

By means of the drive chain 20 the main drive sprocket 13 turns the drive sprocket 21 which is mounted and keyed to the stub drive shaft 22. This shaft is parallel to the axle 11 of the cultivator and runs in the stub drive shaft bearings 23 24 which are mounted on the stub drive shaft standards 25 26. Hinged to a cross brace between the standards 25 26 is a chain idler hanger 27 on which is mounted a chain idler sprocket 28. A chain idler tension spring 29 presses the chain idler sprocket 28 against the drive chain 20, thus taking up any slack in the chain.

On the end of the stub drive shaft 22 is keyed a drive crank 30. This crank operates the drive pitman 31 which rocks the rocker drive arm 32 backward and forward through the arc of a circle. The rocker drive arm 32 is bolted to the rocker arm shaft 33, which is a square shaft parallel to the axle 11 and located at the rear of the machine.

There are three rocker arm shaft bearings 34 35 36. A sleeve held to the shaft by set-screws forms the inside of the bearing. Each one of the bearings 34 35 36 is mounted on the back end of the bearing arms 37 38 39. The bearing arms are hinged at the front of the frame and are raised or lowered by their respective lift bars 40 which are operated by the bell cranks 41. The bell crank 41 and lift bar 40 structures are supported on the frame by the bell cranks being bolted to and pivoting on angle iron hangers which in turn are bolted to the under side of the frame 1 3 and tongue piece 8. An adjusting lever 42 located conveniently on the tongue or draw bar 7 8 at the front of the cultivator operates on a quadrant 43 and can be locked in any desirable position. This lever pulls the lever lift bar 44 operating the beam lift shaft 45 through the beam lift shaft arm 46. This shaft 45 is parallel to and in front of the frame 4 and is held in position by the beam lift shaft hangers 47 48. The beam lift shaft 45 and the beam lift shaft arm 46 transforms the pull of the adjusting lever 42 to the beam lift shaft arms 49 50 (one of which is located at each end of beam lift shaft 45), the beam lift shaft arms 49 50 being attached to the forward pull bars 51. (The forward pull bars can not be seen in Fig. 1 because they are underneath the bearing arms 37 38 and 39 respectively.) Two additional beam lift shaft arms 49 50 are keyed to the shaft 45, one at each end, and hinged to them are the forward pull bars 51. The back ends of these forward pull bars 51 are hinged to their respective bell cranks 41. There is a lever left spring 52 which serves to counterbalance the weight of the rocker arm shaft, rocker arms, shovel beams and shovels. Two additional similar springs (not shown) and for the same purposes are located under the left bearing arm 37 and right bearing arm 39. By operation of the adjusting lever 42 the rocker arm shaft 33 can be raised or lowered, thus gauging the depth of the holes made by the shovels.

Mounted and bolted to the square rocker arm shaft 33 are eight rocker arms 53 arranged alternately at right angles to the shaft. At the end of each rocker arm is a drive rod bearing 54 and a drive rod sleeve 55. In these vertical sleeves 55 operate the drive rods 56 which are hinged to the shovel beams 57. The drive rods are held in normal operating position by drive rod springs 58. Any obstruction in the downward path of one of the shovels would cause the spring 58 to be compressed and the drive rod 56 would slide upward in its sleeve 55 and save the machine from possible breakage. At the back end of the shovel beams 57 are bolted shovel arms 59 to which are bolted the shovels 60. An adjustable brace 61 holds the shovels at the desired working angle. The eight shovel beams 57 are hinged to one shovel beam rod 62 under the front part of the frame 4 which is supported by the shovel beam rod hangers 63. Bearing arm guides 64 are provided at each side of the machine to hold the rocker arm shaft 33 in proper alignment.

With the forward motion of the machine over the ground and with the main drive sprocket wheel 13 engaged with ratchet tooth clutch 14, the drive wheels 5 6 cause the axle 11 and main drive sprocket wheel 13 to revolve, this revolving motion being imparted to the stub drive shaft 22 thru drive chain 20 and drive sprocket 21. The drive crank 30 is attached to the end of and revolves with the stub shaft 22. The revolving of the drive crank 30 imparts an oscillatory motion to the drive pitman 31 which is attached at one end to the drive crank and at the other end to the rocker drive arm 32. The rocker drive arm 32 is attached to the rocker arm shaft 33 on which is attached the rocker arms 53, arranged alternately at right angles to rocker arm shaft. With the oscillatory motion of the drive pitman 31 it will be seen that the outward ends of the rocker arm shafts, moving thru the arc of a circle, will give a distinctly up-and-down movement to the attached drive rods 56 and that this up-and-down movement will be imparted to the shovel beams 57 shovel arms 59 and shovels 60. The alternate arrangement of the rocker arms causes the alternate shovels to work in unison, the effect of the resulting zig-zag arrangement of the holes in the soil being a distinct value by causing the maximum resistance toward surface runoff and soil blowing. The depth at which the shovels operate is regulated by the adjusting lever 42.

Whether operated on a contour or up and down a slope approximately the same surface condition and resistance toward runoff and erosion is obtained, while ordinary cultivators and most other tillage tools must travel on a contour to obtain the maximum resistance to runoff and erosion, and if they are used up and down the slope these evil agencies are greatly accelerated.

Having fully disclosed my discovery, I claim as my invention:

In a device of the class described a rectangular frame having a rotatable drive shaft journaled thereon laterally to the line of travel of the device, drive wheels mounted on ratchet hubs, said hubs being keyed to said shaft, a clutch member keyed to said drive shaft, a clutch member slidably mounted on said drive shaft and arranged to cooperate with said first named clutch member to be driven thereby, means to move said second named clutch member into and out of engagement with said first named clutch member, a drive sprocket secured to said second named clutch member, a stub shaft rotatably supported adjacent one side of said frame and parallel to said drive shaft, a sprocket on said stub shaft and a drive chain engaging said sprockets in power transmitting relation, a crank mounted on said stub shaft and rotated thereby, a rocker arm shaft journaled adjacent the opposite side of said frame from said stub shaft and parallel to said drive shaft, a link connecting said stub shaft crank and said rocker arm shaft to impart thereto an oscillatory movement by rotating said stub shaft crank, links pivotally attached at one end to the first named side of said frame and extending parallel to the line of draft, shovels mounted on the other end of said links, rocker arms on said rocker arm shaft, means connecting said rocker arms to said shovels to transmit movement from said rocker arms to said shovels, and means to control the height of the shovels above the ground.

RAYMOND H. DAVIS.